Figures 1, 2:
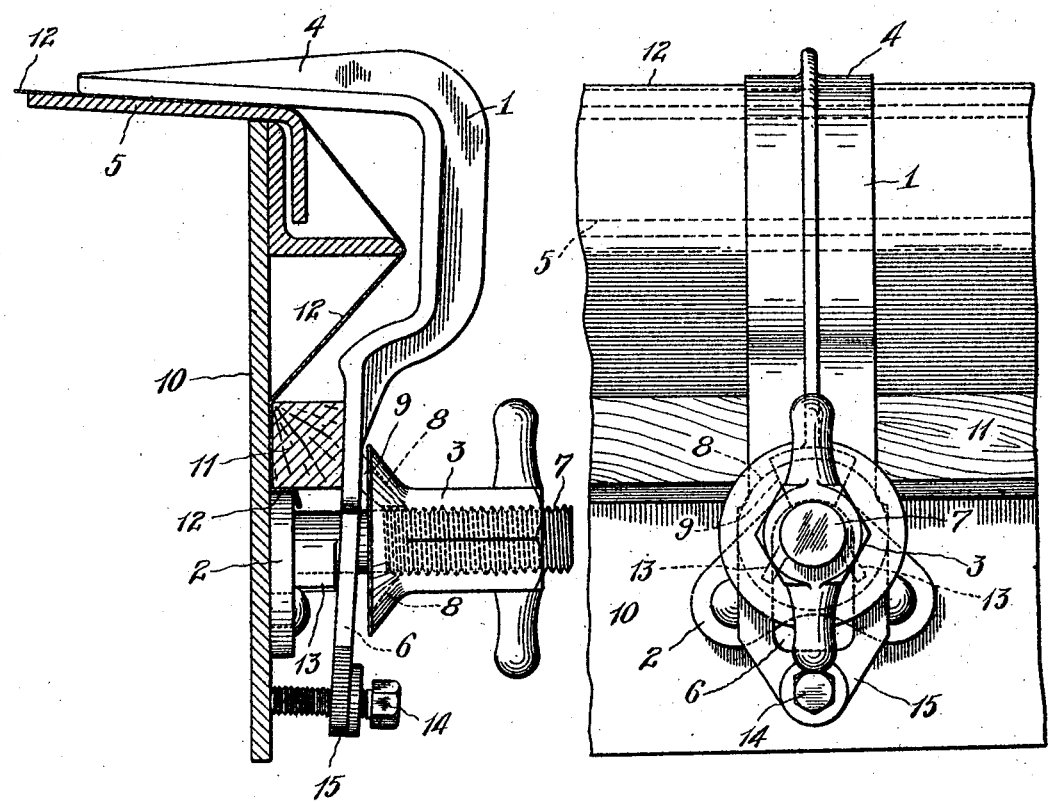

F. W. WATSON.
HATCH FASTENER.
APPLICATION FILED FEB. 12, 1921.

1,413,081.

Patented Apr. 18, 1922.

INVENTOR:
Frederick W. Watson
by Freese, Mertel & Sagwell,
ATTORNEYS.

UNITED STATES PATENT OFFICE.

FREDERICK W. WATSON, OF CLEVELAND, OHIO, ASSIGNOR TO THE MULHOLLAND HATCH FASTENER COMPANY, OF CLEVELAND, OHIO, A CORPORATION OF OHIO.

HATCH FASTENER.

1,413,081.  Specification of Letters Patent.  Patented Apr. 18, 1922.

Application filed February 12, 1921. Serial No. 444,580.

*To all whom it may concern:*

Be it known that I, FREDERICK W. WATSON, a citizen of the United States, resident of Cleveland, county of Cuyahoga, and State of Ohio, have invented new and useful Improvements in Hatch Fasteners, of which the following is a specification, the principle of the invention being herein explained and the best mode in which I have contemplated applying that principle, so as to distinguish it from other inventions.

My invention relates to hatch fasteners, and particularly to an improvement upon the structure of this nature shown, described and claimed in U. S. Letters Patent No. 1,126,064, patented to Mathew Mulholland upon January 26, 1915.

The annexed drawing and the following description set forth in detail certain means embodying my invention, the disclosed means, however, constituting but one of the various mechanical forms in which the principle of my invention may be applied.

In said annexed drawing:—

Figure 1 represents a front elevation of a hatch fastener embodying my invention, showing a fragmentary portion of the deck, hatch-coaming and hatch-cover; and Figure 2 represents a vertical section, partially in side elevation, of the elements shown in Figure 1.

Referring to the annexed drawing, in which the same ordinals refer to the same parts in the two figures, a clamp is indicated by the ordinal 1 having a head portion 4 and a tail portion 15. A bracket secured to the coaming 10 in any desired fashion is indicated by the ordinal 2, the same having an exteriorly threaded extension 7. The tail portion 15 of the clamp 1 encircles the bracket by means of a hole 6. Rotatably mounted upon the bracket portion 7 and engaging the threads thereof by means of a threaded bore, is a fastening member 3. The inner end of said fastening member 3 is enlarged and formed with an integral conical surface 8. The clamp 1 is formed with an outwardly and downwardly inclined conical surface 9 having a degree of inclination the same as that of the surface 8. Said surface 9 is located in a position such that when the clamp 1 is loose, the rotation of the fastening member 3 will cause the surface 8 to engage the surface 9, and further rotation will pull the clamp 1 downwardly on to the hatch cover 5, thereby effecting the desired clamping of the tarpaulin 12. The clamp 1 is so formed that it may also secure between it and the coaming 10 the batten strip 11, this securing being effected when the fastening member 3 is screwed inwardly, causing the clamp 1 to move inwardly, as well as downwardly, as will be understood. The tarpaulin 12 also extends between the batten 11 and the coaming 10.

The features hereinbefore described are well-known, and for co-operation with these standard features I have designed the improvements which I shall now describe in detail: Due to several varying conditions, the pressure of the fastening member 3 upon the clamp 1 is such as to swing the tail portion 15 of said clamp further inwardly than is proper for effective clamping. In order to obviate this difficulty, I form the extension 7 of the bracket 2 with a pair of downwardly extending and divergent abutments 13 lying in the path of movement of the tail portion 15, so that said abutments form stops limiting the inward movement of the said tail portions 15 of clamp 1. However, conditions are such that often the utmost length which can practicably be given to said abutments or stops 13, is not sufficient to adequately limit the inward movement of the tail portion 15 of the clamp 1. Therefore, I form the extreme lower end of the said tail portion 15 with a threaded bore adapted to be engaged by a screw 14 which abuts the coaming 10. By this construction it is possible adjustably to limit the inner movement of the tail portion 15 of the clamp, and thus provide for any unusual conditions which would not adequately be met by the provision of the abutments or stops 13.

What I claim is:

1. In a hatch fastener, the combination of a clamp having a clamping head and a tail portion; a fixed bracket; a fastening member movably mounted on said bracket and adapted to engage and apply pressure to an intermediate portion of said clamp; a stop for limiting the movement of the tail portion and providing a fulcrum point about which the clamp is adapted to be swung by said fastening member; and means independent of said fastening member for relieving the pressure on said stop.

2. In a hatch fastener, the combination of a clamp having a clamping head and a tail portion; a fixed bracket; a fastening member movably mounted on said bracket and adapted to engage an intermediate portion of said clamp; and stops for limiting the movement of the tail portion and providing fulcrum points about which said clamp is adapted to be swung by said fastening member, one of said stops being adjustable whereby said clamp may be fulcrumed upon either of said stops.

3. In a hatch fastener, the combination of a clamp having a clamping head and a tail portion; a fixed bracket; a fastening member movably mounted on said bracket and adapted to engage an intermediate portion of said clamp; a fixed stop carried by said bracket and engageable with said tail portion of the clamp; and an adjustable stop member mounted upon the end of the tail portion of the clamp.

4. In a hatch fastener, the combination of a clamp having a clamping head and a tail portion; a fixed bracket; a fastening member movably mounted on said bracket and adapted to engage an intermediate portion of said clamp; and an adjustable stop member mounted upon the end of said tail portion to provide a fulcrum about which said clamp is adapted to be swung by said fastening member.

Signed by me this 9th day of February, 1921.

F. W. WATSON.